United States Patent
Shabi et al.

(10) Patent No.: US 11,048,426 B2
(45) Date of Patent: Jun. 29, 2021

(54) DEDUPLICATING UNALIGNED DATA

(71) Applicant: EMC IP Holding Company LLC, Hopkinton, MA (US)

(72) Inventors: Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/668,506

(22) Filed: Oct. 30, 2019

(65) Prior Publication Data

US 2021/0132834 A1 May 6, 2021

(51) Int. Cl.
*G06F 3/06* (2006.01)

(52) U.S. Cl.
CPC ............ *G06F 3/0641* (2013.01); *G06F 3/067* (2013.01); *G06F 3/0608* (2013.01); *G06F 3/0652* (2013.01); *G06F 3/0653* (2013.01)

(58) Field of Classification Search
CPC .... G06F 3/0641; G06F 3/0652; G06F 3/0653; G06F 3/067; G06F 3/0608
See application file for complete search history.

(56) References Cited

U.S. PATENT DOCUMENTS

| | | | |
|---|---|---|---|
| 5,990,810 A | 11/1999 | Williams | |
| 8,799,601 B1 | 8/2014 | Chen et al. | |
| 9,569,455 B1 | 2/2017 | Bono et al. | |
| 9,846,718 B1* | 12/2017 | Ruef | G06F 3/0641 |
| 10,037,336 B1 | 7/2018 | Hu et al. | |
| 2011/0238635 A1 | 9/2011 | Leppard | |
| 2013/0097380 A1 | 4/2013 | Colgrove et al. | |
| 2014/0115260 A1 | 4/2014 | Maybee et al. | |
| 2015/0012503 A1* | 1/2015 | Akirav | G06F 16/1748 707/692 |
| 2016/0188622 A1 | 6/2016 | Sharangpani | |
| 2018/0004434 A1 | 1/2018 | Khan et al. | |
| 2018/0000394 A1 | 2/2018 | Shadrin et al. | |
| 2018/0285379 A1 | 10/2018 | Dain et al. | |
| 2020/0341668 A1* | 10/2020 | Gonczi | G06F 3/0673 |
| 2020/0382315 A1* | 12/2020 | Lakk | H04L 9/3247 |

OTHER PUBLICATIONS

Armangau, Philippe, et al.; "Inline Deduplication of Compressed Data," U.S. Appl. No. 14/980,944, filed Dec. 28, 2015.
Armangau, Philippe, et al.; "Speeding De-Duplication Using a Temporal Digest Cache," U.S. Appl. No. 15/668,388, filed Aug. 3, 2017.
Armangau, Philippe, et al.; "Speeding Deduplication Using a Most Wanted Digest Cache," U.S. Appl. No. 15/799,117, filed Oct. 31, 2017.
Swift, Jeremy; "Deduplication and Compression of Data Segments in a Data Storage System," U.S. Appl. No. 15/976,371, filed May 10, 2018.

* cited by examiner

*Primary Examiner* — Sean D Rossiter
(74) *Attorney, Agent, or Firm* — BainwoodHuang (57) ABSTRACT

A technique for performing deduplication identifies representative sub-blocks within candidate blocks and performs sub-block matching to entries in a digest database. When a representative sub-block is matched to a differently-aligned target sub-block that belongs to a target block, the technique effectuates storage of the candidate block using the target block and a block adjacent to the target block.

18 Claims, 5 Drawing Sheets

DEDUPLICATING UNALIGNED DATA

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems use a process called "deduplication" to improve storage efficiency. For example, a storage system maintains a database of entries, in which each entry stores a digest of a respective block of data and a pointer to a stored version of that block in the storage system. The storage system computes each digest as a hash of a respective block, such that different blocks produce different hash values (digests) and identical blocks produce the same hash values. The high uniqueness of hash values enables the storage system to use them as representatives of respective blocks, even though the hash values themselves are typically much smaller than the blocks they represent. When a storage system receives a write request that specifies a candidate block to be stored at a designated logical address, the storage system computes a hash of the candidate block and performs a lookup into the database for the computed hash. If a match is found, the storage system may confirm the match by comparing the newly-arriving block with the block pointed to by the matching digest entry. Assuming the blocks match, the storage system effectuates storage of the newly-arriving block by pointing its logical address to the previously-stored block pointed to by the matching entry. Redundant storage of the block is therefore avoided. Deduplication may be run in-line with storage requests, near inline, or in the background.

SUMMARY

Conventional deduplication schemes operate on a per-block basis, e.g., by generating a hash of a candidate block and performing a lookup of that hash in a digest database. If a storage system finds a match to a target block listed in the database, the storage system may deduplicate the candidate block by pointing its logical address to the data of the target block.

Some storage systems receive host writes in data increments that are different from a storage system's block size. For example, a storage system may use a block size of 4 kB or 8 kB, while a host application may issue writes at sector-based granularity (e.g., in 512-Byte increments). When the storage system receives sector-based writes and arranges the sectors into blocks, the alignment of sectors within blocks can vary. For example, the same sector that appears at position 3 in one block may appear at position 1 in another block, even though the data surrounding the sector in both cases is the same.

Unfortunately, variable alignment creates challenges for block-based deduplication. For example, current deduplication schemes see the same block shifted by one sector as a completely different block, causing deduplication on that block to fail. Although it is possible to greatly expand the size of a digest database to accommodate all possible alignments of sectors within blocks, doing so may consume excessive memory and may not be practical. It would also be burdensome for the storage system to compute a hash value for every possible alignment.

In contrast with conventional schemes, in which storage systems treat shifted data as unique, an improved technique identifies representative sub-blocks within candidate blocks and performs sub-block matching to entries in a digest database. When a representative sub-block is matched to a differently-aligned target sub-block that belongs to a target block, the technique effectuates storage of the candidate block using the target block and a block adjacent to the target block.

Advantageously, the improved technique successfully deduplicates candidate blocks to target blocks having different alignments. Many deduplication attempts that would otherwise fail are able to succeed, increasing data reduction and storage efficiency.

Certain embodiments are directed to a method of performing data deduplication. The method includes selecting a representative sub-block of a candidate block, the representative sub-block occupying a first position within the candidate block. The method further includes matching the representative sub-block to an entry in a digest database, the matching entry identifying a target block that contains the representative sub-block in a second position, and effectuating storage of the candidate block by referencing the target block and an adjacent block adjacent to the target block.

Other embodiments are directed to a computerized apparatus constructed and arranged to perform a method of performing data deduplication, such as the method described above. Still other embodiments are directed to a computer program product. The computer program product stores instructions which, when executed on control circuitry of a computerized apparatus, cause the computerized apparatus to perform a method of performing data deduplication, such as the method described above.

According to some examples, selecting the representative sub-block of the candidate block includes executing a deterministic function on multiple sub-blocks of the candidate block, and providing the representative sub-block as a sub-block of the multiple sub-blocks for which the deterministic function generates an extremum result. According to some variants, the deterministic function is an entropy function, and the representative sub-block is a highest-entropy sub-block of the multiple sub-blocks.

In some examples, the digest database associates the matching entry with a list of full blocks that contain the representative sub-block.

According to some examples, the list of full blocks includes descriptive data about the full blocks, and the method further includes selecting one of the full blocks based at least in part on the descriptive data for that full block.

In some examples, the descriptive data for one of the full blocks indicates a storage tier on which that full block is placed, and selecting one of the full blocks is based at least in part on the storage tier indicated for that full block.

In some examples, the descriptive data for one of the full blocks includes a reference count that indicates a number of times that the full block has been a target of deduplication, and selecting one of the full blocks is based at least in part on the reference count indicated for that full block.

In some examples, the descriptive data for one of the multiple full blocks includes a sequential-block indicator that indicates whether the full block is part of a sequence of blocks, and selecting one of the full blocks is based at least in part on the sequential block indicator for that full block.

In accordance with some examples, matching the representative sub-block to the entry in the digest database includes generating a sub-block hash of the representative sub-block and matching the sub-block hash to a digest in the digest database associated with the matching entry.

In some examples, generating the sub-block hash includes performing at least one of (i) a cryptographic hash, (ii) a semi-cryptographic hash, and (iii) a similarity hash on the representative sub-block.

In some examples, the technique further includes comparing the first position to the second position to determine whether the adjacent block is a preceding block or a following block and accessing, based on the comparing, the adjacent block as one of the preceding block and the following block.

In some examples, the technique further includes comparing data of a set of sub-blocks of the adjacent block to a corresponding set of sub-blocks of the candidate block, and, in response to the set of sub-blocks of the adjacent block matching the corresponding set of sub-blocks of the candidate block, (i) comparing a set of additional sub-blocks of the adjacent block to a set of sub-blocks of an adjacent candidate block adjacent to the candidate block and (ii) in response to one or more of the set of additional sub-blocks of the adjacent block matching one or more of the set of sub-blocks of the adjacent candidate block, performing a deduplication operation on the adjacent candidate block.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for performing deduplication identifies representative sub-blocks within candidate blocks and performs sub-block matching to entries in a digest database. When a representative sub-block is matched to a differently-aligned target sub-block that belongs to a target block, the technique effectuates storage of the candidate block using the target block and a block adjacent to the target block.

Figure 1:
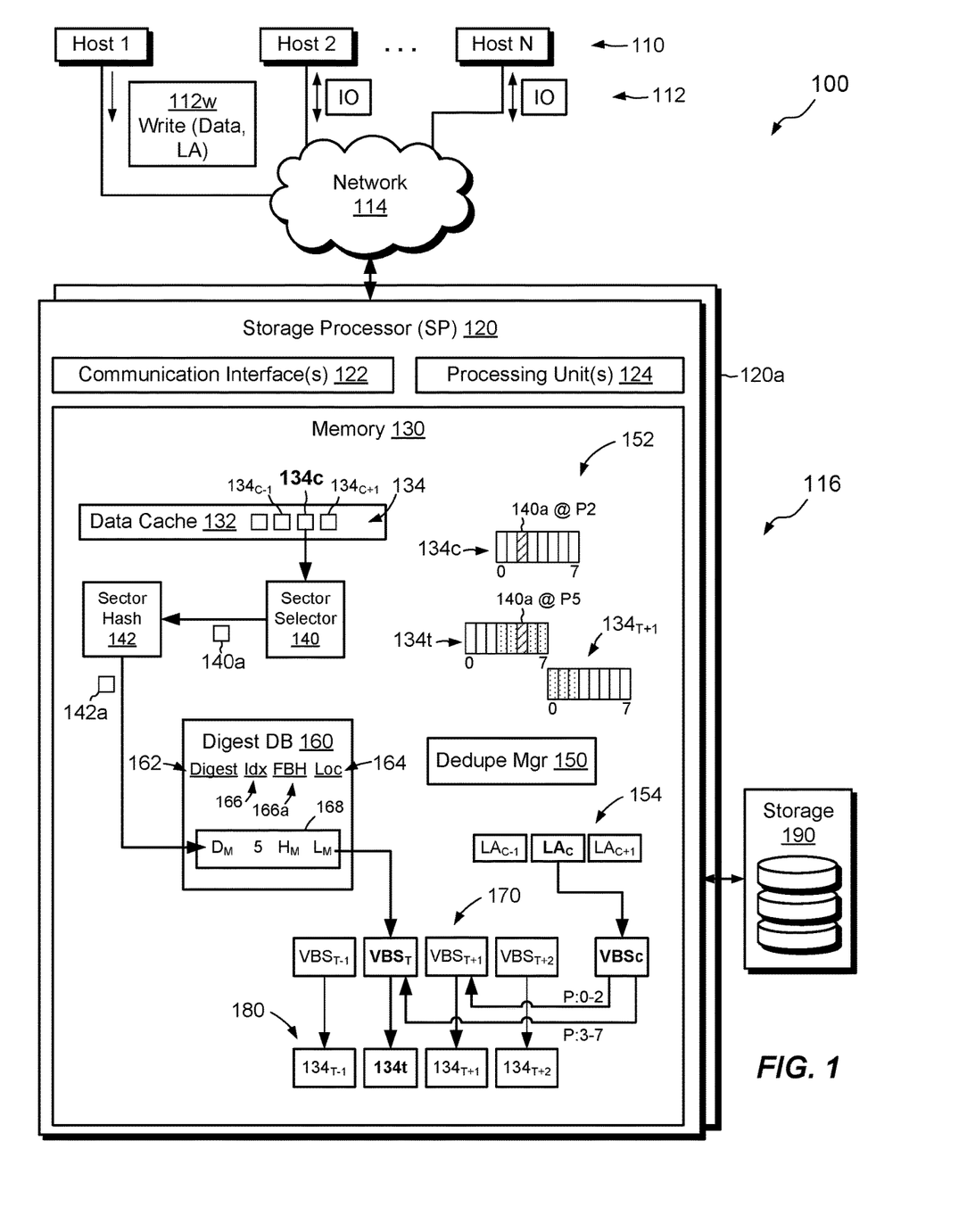
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be provided. No particular hardware configuration is required, however, as any number of SPs may be used, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CMS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 132, a sector selector 140, a deduplication ("dedupe") manager 150, and a digest database 160. The data cache 132 is configured to receive incoming writes of the I/O requests 112 and to store data 134 specified by those writes until such data 134 can be persisted in storage 190. The sector selector 140 is configured to select representative sub-blocks 140a as representatives of blocks 134 and to enable full-block matching based on comparisons of sub-blocks. The dedupe manager 150 is configured to orchestrate deduplication activities, such as maintaining the digest database 160 and directing deduplication of data blocks. The digest database 160 is configured to store entries 168 that associate digests 162 of sub-blocks with corresponding storage locations 164 at which the respective data blocks can be found. The locations may be cached locations, persisted locations, or any other locations. A digest entry 168 may further include an index (Idx) 166, such as an integer from 0 to 7, which identifies the position of the referenced sub-block within the respective block. As the digest database 160 is arranged based on sub-blocks (e.g., sectors), digests 162 are provided as sub-block digests, such as sector hashes. Certain entries 168 may include full-block hashes 166a of the data blocks that contain the referenced sub-blocks. Digests 162 may be computed as cryptographic hashes, such as SHA-2 or MD-5, as semi-cryptographic hashes, which may be prone to occasional collisions, or as similarity hashes ("sim hashes"). As described below in connection with FIG. 3, sim hashes differ from one another in relation to differences in the data blocks or sub-blocks from which they are created. Thus, sim hashes allow a storage system to estimate the extent of differences between data blocks or sub-blocks without having to compare the data blocks or sub-blocks directly. In some examples, the dedupe database 160 is stored persistently in storage 190, with portions loaded into memory 130 as needed.

In example operation, hosts 110 issue I/O requests 112 to the data storage system 116. The SP 120 receives the I/O requests 112 at the communication interface(s) 122 and initiates further processing. The I/O requests 112 include write requests 112w, which specify data and respective logical addresses (LAs) at which the respective data are to be written. In an example, the SP 120 receives the respective data into the data cache 132, which arranges the host data in data blocks 134.

In an example, SP 120 accesses data blocks 134 in the data cache 132 as candidates for deduplication. For example, a sector selector 140 accesses a candidate block 134c and proceeds to select a representative sub-block 140a from that candidate block 134c. The representative sub-block 140a is also referred to herein as a representative sector or "anchor sector." The sector selector 140 selects the anchor sector 140a from among all of the sectors in the candidate block 134c using a deterministic function, i.e., a function that produces the same output when provided with the same input. In an example, the sector selector 140 applies the deterministic function to each sector in the candidate block 134c and selects the anchor sector 140a as the sector for which the deterministic function produces an extremum result, i.e., a maximum or a minimum.

In a particular example, the deterministic function is an entropy function that provides a measure of information entropy. The sector selector 140 preferably selects the anchor sector 140a as the highest-entropy sector in the candidate block 134c. Alternatively, the deterministic function may be a redundancy function that provides a measure of redundancy, in which case the sector selector 140 selects the lowest-redundancy sector as the anchor sector 140a. The rationale for selecting the highest entropy (or lowest redundancy) sector is that it is most likely to be unique and therefore capable of distinguishing the candidate block 134c from other blocks 134. Selecting a low-entropy sector, such as all zeros, would likely provide a poor discriminator of blocks, as sequences of zeros are likely to be found in many blocks. Also, anchor sectors 140a provide an effective vehicle for matching identical data blocks with different alignment. Even if identical blocks do not match on account of their misalignment, the anchor sectors 140a will still match, assuming that misalignments occur in whole-sector increments.

Once the sector selector 140 has selected the anchor sector 140a, SP 120 operates a sector hash function 142 on the anchor sector 140a to produce a sector hash 142a. The sector hash 142a may be generated as a cryptographic hash, a semi-cryptographic hash, a sim hash, or some other type of hash. The sector hash function 142 is preferably the same as the one used to generate digests 162 in the digest database 160.

With the sector hash 142a of the anchor sector 140a thus generated, the dedupe manager 150 proceeds to perform a search, such as a lookup, for the sector hash 142a in the digest database 160. A match of the sector hash 142a to an entry 168 in the digest database 160 indicates with high reliability that the matching entry 168 references the anchor sector 140a and thus the candidate block 134c, or at least a portion of the candidate block 134c.

In an example, the dedupe manager 150 checks for a full-block match by generating a full-block hash of the candidate block 134c and comparing it to the full-block hash 166a of the block referenced by the matching entry 168. If the hash values match, then the full-block match may be confirmed. In some examples and depending upon the particular hash function used, the dedupe manager 150 may directly compare the data of the candidate block 134c with that of the block referenced by the matching entry 168. A full-block match means that the two blocks are aligned. In the case of a full-block match, the dedupe manager 150 effectuates storage of the candidate block 134c by providing a reference to the target block, i.e., the block pointed to by the matching entry 160 (block 134t in the example shown). For example, the dedupe manager 150 stores the candidate block 134c by establishing pointers between a logical address of the candidate block 134c and the target block 134t.

More typically, comparing the full-block hashes of the candidate block 134c and the target block 134t reveals a mismatch. The mismatch may arise based on differences in data and/or differences in alignment. Arrow 152 shows an example of misalignment between the candidate block 134c and a target block 134t, i.e., the block referenced by the matching entry 168. As shown, each block 134c or 134t contains 8 sectors, including the anchor sector 140a. The anchor sector 140a appears at position 2 (zero-based) in the candidate block 134c and at position 5 of the target block 134t. At this time, the dedupe manager 150 may confirm that the corresponding sectors of the candidate block 134c and the target block 134t indeed match, e.g., by comparing the data at sector positions 0-4 of the candidate block with the data at positions 3-7 of the target block 134. If the corresponding sectors do not match, then the dedupe manager 150 may abandon the effort to match the blocks, as the blocks are clearly different. However, if the corresponding sectors do match, then there is a chance that the match may be completed.

SP 120 is capable of detecting adjacencies among data blocks. For example, SP 120 maintains virtual block structures (VBSs) 170, which provide block virtualization and record information about sequential writes. Five VBSs 170 are shown, with each VBS representing a data block. $VBS_T$ represents the target block 134t and is pointed to by the matching entry 168. $VBS_{T-1}$ represents a preceding block and $VBS_{T+1}$ represents the next block. $VBS_{T+2}$ represents the next block after $VBS_{T+1}$. Together, $VBS_{T-1}$, $VBS_T$, $VBS_{T+1}$, and $VBS_{T+2}$ represent a sequence of contiguous blocks, which SP 120 may initially have received sequentially.

To complete a match to the candidate block 134c, the dedupe manager 150 leverages the adjacencies recorded by the VBSs 170 to access $VBS_{T+1}$, which represents the next block after $VBS_T$. The dedupe manager 150 then follows $VBS_{T+1}$ to physical block $134_{T+1}$, the next block after the target block 134t. As further shown by arrow 152, the dedupe manager 150 checks the first 3 sectors of block $134_{T+1}$ to confirm that they match the last 3 sectors of the candidate block 134c, which were missing from the target block 134t. If the 3 sectors match, then the dedupe manager 150 establishes an unaligned block match between the candidate block 134c and portions of two target blocks—block 134t and block $134_{T-1}$.

The dedupe manager 150 then effectuates storage of the candidate block 134c by providing a reference to the target block 134t and a reference to the next (adjacent) block $134_{T+1}$. For example, SP 120 maintains a logical layer that represents logical addresses (LAs) of data objects, such as LUNs, file systems, and the like. Three logical addresses 154 of the logical layer are shown, a logical address $LA_C$ for the candidate block and logical addresses $LA_{C-1}$ and $LA_{C+1}$ for blocks that are logically adjacent to the candidate block 134c. In an example, the storage system 116 maps logical addresses 154 to VBSs 170. For instance, the logical address $LA_C$ of the candidate block 134c maps to $VBS_C$, and $VBS_C$ points to the underlying data. As shown, $VBS_C$ has one pointer to the target block 134t via $VBS_T$ and another pointer to the adjacent block $134_{T+1}$ via $VBS_{T+1}$. Each pointer identifies the sectors being referenced in the pointed-to blocks: sectors 3-7 in the target block 134t and sectors 0-2 in the adjacent block $134_{T+1}$. One should appreciate that there are many ways to map data and that the details of logical addresses 154, VBSs 170, and physical blocks 180 are intended to be illustrative rather than limiting.

In the manner shown, the dedupe manager 150 has succeeded in storing the candidate block 134c without storing a duplicate copy of its data. Rather, storage of the candidate block 134c is achieved by reference to the target block 134t and the adjacent block $134_{T+1}$. Although the adjacent block in the example shown is the next block $134_{T+1}$, it may alternatively be the previous block, $134_{T-1}$. For example, if the anchor sector 140a had instead been located at positions 0 or 1 of the target block 134t, then the adjacent block containing the additional sectors would have been the previous block $134_{T-1}$.

In some examples, the dedupe manager 150, when comparing sectors of the candidate block 134c to corresponding sectors of an adjacent block, such as block $134_{T+1}$ or $134_{T-1}$, may attempt to extend matching sectors beyond the limits of the candidate block 134c, e.g., by continuing to another adjacent candidate block, such as block $134_{C+i}$ or $134_{C-1}$, and continuing even further as long as the matches continue.

In this manner, the dedupe manager 150 can effectively achieve deduplication of adjacent candidate blocks without the need to select additional anchor sectors 140a, compute additional sector hashes 142a, or perform additional lookups in the digest database 160.

Figure 2:
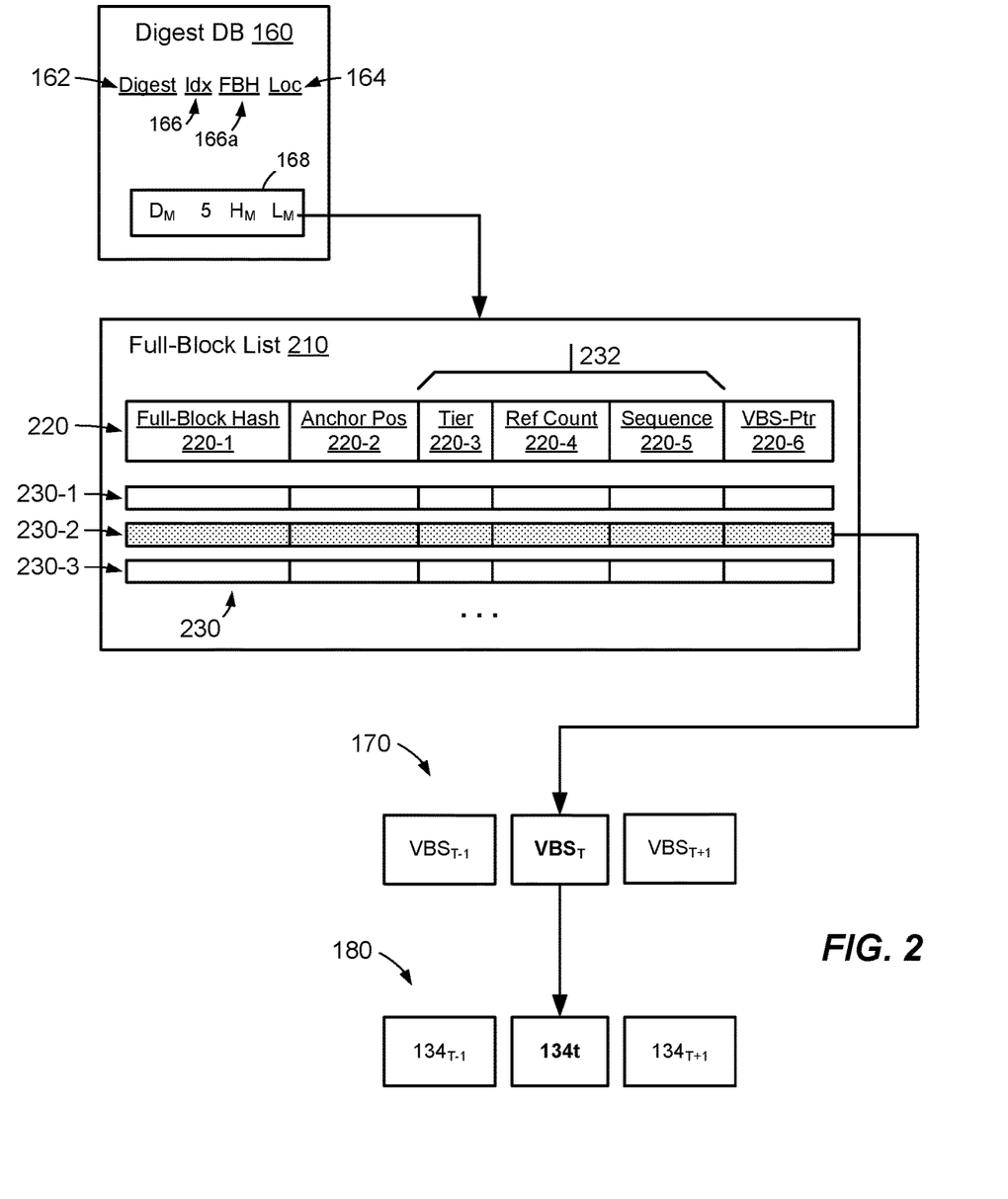
FIG. 2 is a block diagram of an example full-block list associated with a digest entry of a digest database.

FIG. 2 shows additional features of the digest database 160. Here, a full-block list 210 is provided for each entry 168 of the digest database 160 for which a sector hash identifies multiple blocks. Each full-block list 210 (a single one shown) may be considered to be part of the associated digest entry 168 and provides a second-level digest specific to the sector hash 162 of the associated digest entry 168.

As shown, the full-block list 210 includes block entries 230 (e.g., 230-1, 230-2, 230-3, and so on), where each block entry 230 represents a distinct block that produced the same sector hash 142a, i.e., a hash that matched the digest 162 of the entry 168. Each block entry 230 thus represents a respective block whose data differs from that of all the other blocks on the list. Differences can arise as a result of different alignments and/or differences in contents. Each block entry 230 is seen to include multiple fields 220:

Full-Block Hash 220-1. A hash of the entire block represented by the respective entry. The hash may be a cryptographic hash, a semi-cryptographic hash, a sim hash, or some other type of hash.

Anchor Position 220-2. The sector position of the anchor sector 140a in the respective block.

Tier 220-3. A storage tier to which the respective block is assigned. May be specified by tier number or descriptor and corresponds to quality of service of storage media.

Reference Count. A counter that indicates a number of deduplications performed using the respective block as a target of deduplication.

Sequence 220-5. An indicator of whether the respective block is part of a group of sequential blocks. May be expressed as a number of blocks written together in a sequence that includes the respective block.

VBS-Ptr 220-6. A pointer to the respective block via Virtual Block Structure (VBS).

The tier 220-3, reference count 220-4, and sequence 220-5 fields provide descriptive data 232, which the dedupe manager 150 may use in selecting a target block from the list 210. Descriptive data 232 is not limited to the particular types of data shown, however.

The full-block list 210 enables the dedupe manager 150 to optimize its selections of target blocks. The blocks listed in the full-block list 210 for a particular sector hash provide different options for target blocks. Any of them could be selected as a target for deduplicating the candidate block, but some options may result in better performance than others.

For example, if a candidate block is assigned to a fast storage tier, system performance might suffer if the target block is selected from a slower storage tier. Thus, target blocks should normally be selected from storage tiers that are equal to or higher than the tiers to which the respective candidate blocks are assigned.

Also, overall system performance may be enhanced by selecting target blocks with larger reference counts 220-4 over target blocks with smaller reference counts. Selecting target blocks with larger reference counts tends to concentrate storage in fewer numbers of physical blocks and thus improve data reduction overall. In some cases, however, selecting target blocks with smaller reference counts may be preferred, e.g., to avoid contention for disk resources that could result from having large numbers of logical blocks mapping to small numbers of physical blocks.

As yet another example, sequence indicators 220-5 may inform the dedupe manager 150 as to whether any adjacent blocks to a target block can be found. If a target block is not part of any sequence, then there will be no adjacent blocks in which to find additional sector matches. Thus, the dedupe manager 150 preferably selects target blocks that are parts of sequences when performing unaligned deduplication. In addition, target blocks that are parts of longer sequences may be preferred over target blocks that are parts of shorter sequences, owning to the fact that matches to adjacent blocks can be extended to any number of adjacent blocks, with overall efficiency improved as more adjacent blocks are matched.

Figure 3:
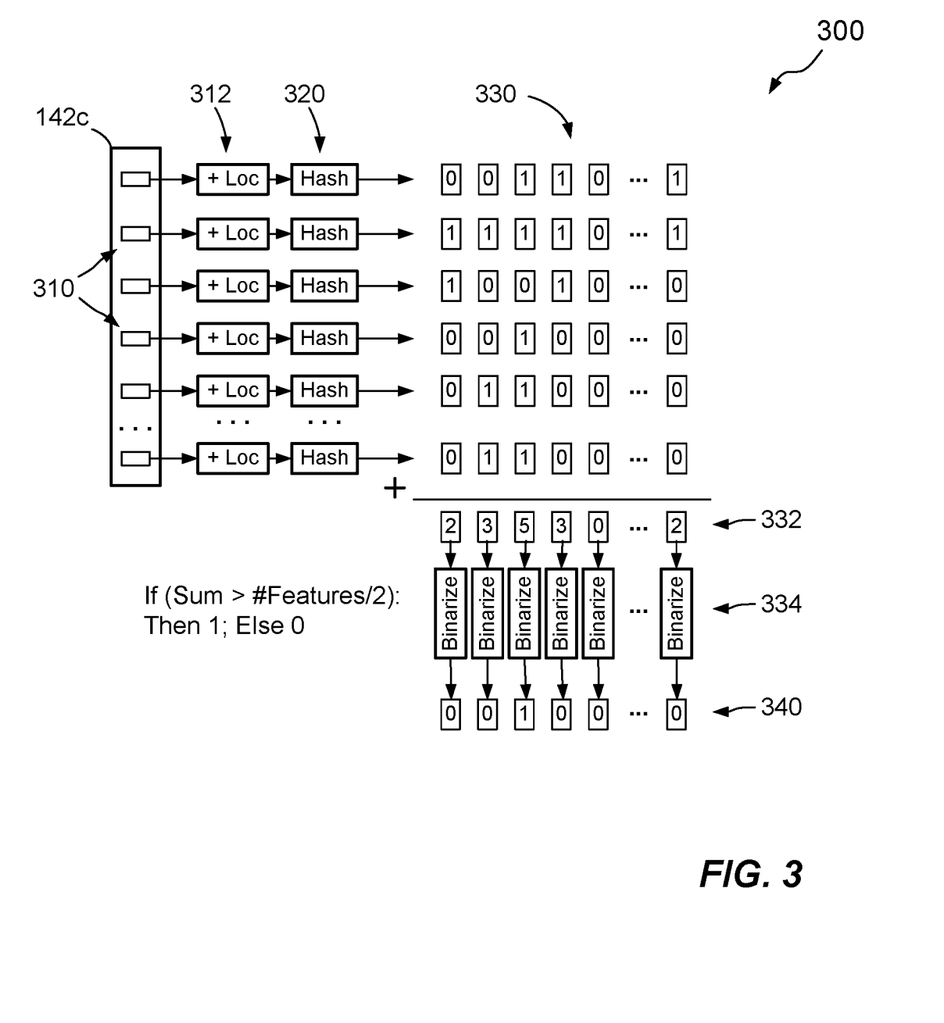
FIG. 3 is a block diagram of an example arrangement for generating a similarity hash.

FIG. 3 shows an example arrangement 300 for generating a similarity hash (sim hash) 340. As indicated above, sim hashes are one option for generating sector hashes 142a and/or full-block hashes. Various methods may be used for generating sim hashes. The example shown is intended to be illustrative rather than limiting.

The illustrated approach begins by obtaining a candidate block 142c and dividing the block into multiple features 310. Each feature 310 is a portion of the candidate block 142c, and together the features 310 make up the entire candidate block 142c. Features 310 may be arbitrarily small, with 4 or 8 Bytes being expected sizes. There is no need for different features 310 to have the same length, however.

As shown by arrow 312, the data of each feature 310 is salted with a location indicator, which corresponds, for example, to a relative position of the respective feature in the block 142c. For instance, the first feature (topmost) may be salted by concatenating this feature with a "1," the second feature may be salted by concatenating it with a "2," and so forth. Salting each feature 310 with an indicator of its position ensures that the same feature is represented differently when it appears in different positions within the block 142c.

As shown by arrow 320, a hash function is executed on each salted feature 310 individually. The hash function may be a fully cryptographic or semi-cryptographic hash function, for example.

As shown by arrow 330, each hash function produces a respective hash value, with one hash value produced for each feature 310. The bits of each hash value are shown horizontally, e.g., with the MSB of the hash value on the left and the LSB on the right.

The corresponding bits of the hash values are then summed (vertically) to produce a column sum 332 for each bit position of the feature-hashes. The column sums 332 are then binarized (334) to produce respective results. Binarizing each sum 332 includes, for example, setting the result to "1" if the column sum is greater than the number of features 310 in the block 142c divided by 2 and setting the result to "0" otherwise. Stated another way, results are set to "1" if more than half the bits in the column are "1;" otherwise they are set to "0." The results of binarization taken together and in order form a sim hash 340. The sim hash 340 thus includes a bit for each bit of the feature-hashes 330.

The sim hash 340 has the desired property of producing similar results for similar candidate blocks 142c but of producing increasingly different results for increasingly different candidate blocks 142c. The illustrated arrangement thus allows Hamming distances between sim hashes 340 to be used as a proxy for Hamming distances between the corresponding blocks. Owing to the manner in which sim hashes 340 are generated, they should generally not be relied upon for exact-block matching, as it is possible for two sim hashes 340 to be identical even though the underlying blocks are different.

Sim hashes 340 may form the entirety of digests 162 (one sim hash per digest), but this is not required. For example, digests 162 may include other components. These components may include full or semi-cryptographic hashes of respective blocks. They may also include sim hashes of particular sub-blocks. According to some variants, each digest 162 includes a sim hash of a particular sector of the respective block. The particular sector may be selected as the highest entropy sector in the block, such that blocks can be matched even if they are misaligned relative to usual block boundaries. In some examples, digests 162 include sector sim hashes but not full-block sim hashes, with the same methodology applied (e.g., buckets and subsets) as described above, but operating based on sector sim hashes rather than on full-block sim hashes.

Figure 4:
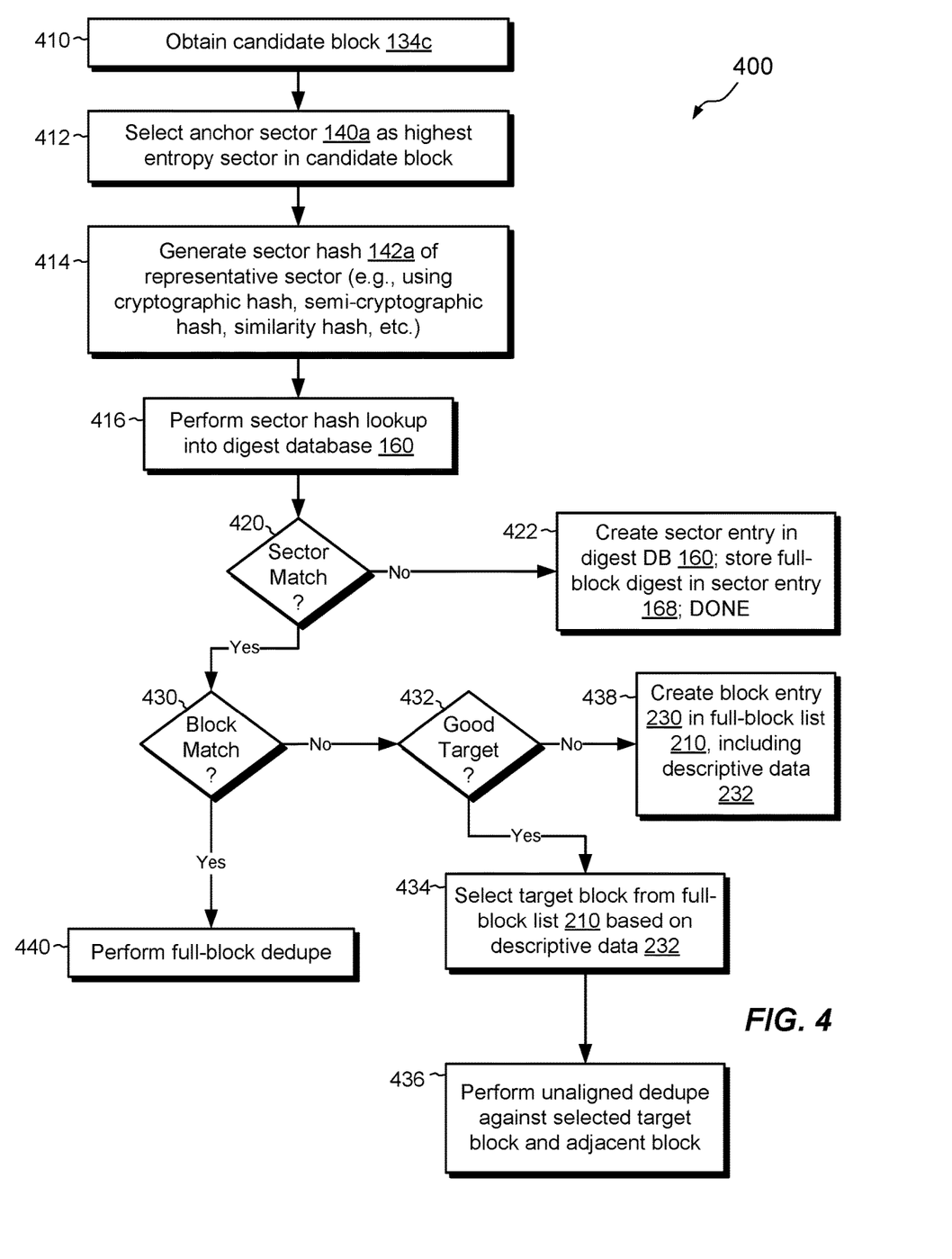
FIGS. 4 and 5 are flowcharts showing example methods of performing deduplication.
Figure 5:
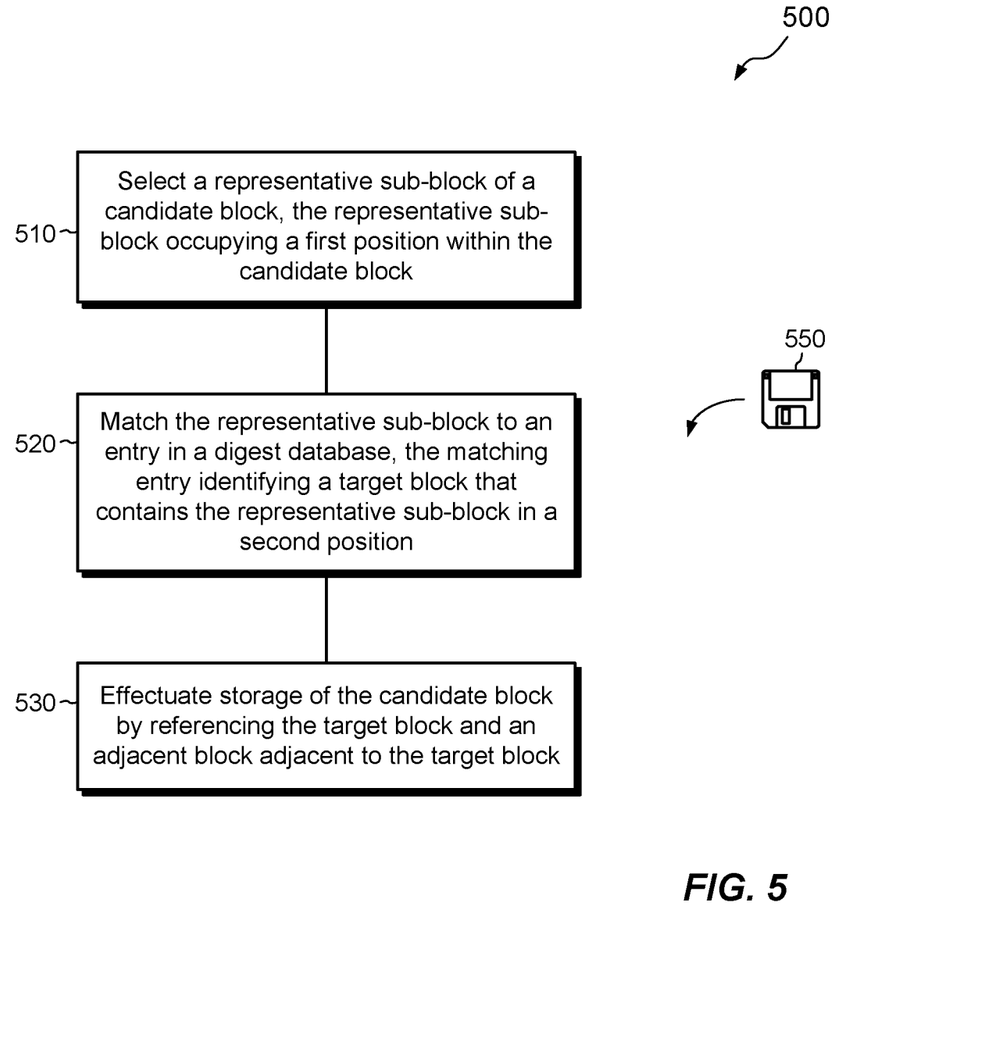

FIGS. 4 and 5 show methods 400 and 500 for performing deduplication in the environment 100. The methods 400 and 500 may be carried out, for example, by the software constructs shown in FIG. 1, which reside in the memory 130 of the storage processor 120 and are run by the set of processing units 124. The various acts of methods 400 and 500 may be conducted in any suitable way. Accordingly, embodiments may be constructed in which acts are performed in orders different from those illustrated, which may include performing some acts simultaneously.

In FIG. 4, the method 400 begins at 410, whereupon the sector selector 140 obtains a candidate block 134c. At 412, the sector selector 140 selects an anchor sector 140a, e.g., as the highest-entropy sector in the candidate block 134c.

At 414, the SP 120 operates the hash function 142 on the anchor sector 140a to generate the sector hash 142a. The sector hash may be a cryptographic hash, a semi-cryptographic hash, a sim hash, or some other type of hash.

At 416, the dedupe manager 150 performs a search, such as a lookup, for the sector hash 142a in the digest database 160. At 420, if no sector match is found, operation proceeds to 422, whereupon he dedupe manager 150 creates a new sector entry 168 in the digest database 160 for unmatched sector hash 142a, storing the sector hash 142a as the digest 162. The dedupe manager 150 also stores the index 166 of the anchor sector 140a, the full-block hash 166a of the candidate block 134a, and a pointer 164 to a location of the candidate block 134 in storage. Here, no sector-based deduplication is completed, but other data reduction procedures may be attempted.

If a sector match is found at 420, operation proceeds to 430, whereupon the dedupe manager 150 determines whether there is a full-block match. For example, the dedupe manager 150 compares a full-block hash of the candidate block 134c with the full-block hash 166a in the matching entry 168. Depending on implementation, additional checks may be performed.

If a full-block match is found at 430, operation proceeds to 440, where a full-block deduplication is performed. This may involve, for example, providing a reference to the target block 134t pointed to by the matching entry 168, e.g., by pointing the logical address of the candidate block 134c to the target block 134t.

If no full-block match is found at 430, operation instead proceeds to 432, whereupon the dedupe manager 150 determines whether an acceptable target can be found. If not, e.g., because no target listed in the full-block list 210 is in the proper tier or meets some other requirement, operation proceeds to 438. Here, the dedupe manager 150 creates a block entry 230 for the candidate block 134c in the full-block list 210. This act may include providing descriptive data 232 for the candidate block 134c. No unaligned deduplication is completed, although other data reduction techniques may be attempted.

If at 432 an acceptable target can be found, operation instead proceeds to 234, whereupon the dedupe manager 150 selects a target block from the full-block list 210, e.g., based on the descriptive data 232.

At 436, the dedupe manager 150 performs an unaligned deduplication of the candidate block 134c to the selected target block and an adjacent block, which is adjacent to the selected target block. The method 400 is then completed.

In FIG. 5, the method 500 for performing deduplication begins at 510, where a representative sub-block 140a of a candidate block 134a is selected. The representative sub-block 140a occupies a first position within the candidate block 134c, which can be any sector location within the candidate block 134c, for example.

At 520, the representative sub-block 140a is matched to an entry 168 in a digest database 160. The matching entry 168 identifies a target block 134t that contains the representative sub-block 140a in a second position, which can be any sector location within the target block 134t.

At 530, storage of the candidate block 134c is effectuated by referencing the target block 134t and an adjacent block adjacent to the target block 134t, such as block $134_{T+1}$ or block $134_{T-1}$, for example.

An improved technique has been described for performing deduplication. The technique identifies representative sub-blocks 140a within candidate blocks 134c and performs sub-block matching to entries 168 in a digest database 160. When a representative sub-block 140a is matched to a differently-aligned target sub-block that belongs to a target block 134t, the technique effectuates storage of the candidate block 134c using the target block 134t and a block adjacent to the target block 134t. Advantageously, the improved technique successfully deduplicates candidate blocks to target blocks having different alignments.

Having described certain embodiments, numerous alternative embodiments or variations can be made. For example, although embodiments have been described in which candidate blocks 134c are obtained from a data cache 132, they may alternatively be obtained from other sources, which may include persistent storage. Thus, there is no requirement that embodiments be limited to inline deduplication. To the contrary, embodiments may also be used in connection with near-inline deduplication and/or background deduplication, as well as inline deduplication. Also, while embodiments have been described in connection with sectors (512-Byte units), other embodiments may be constructed using sub-blocks of other sizes.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of performing data deduplication, the method comprising:
    selecting a representative sub-block of a candidate block, the representative sub-block occupying a first position within the candidate block;
    matching the representative sub-block to an entry in a digest database, the matching entry identifying a target block that contains the representative sub-block in a second position, and
    effectuating storage of the candidate block by referencing the target block and an adjacent block adjacent to the target block,
    wherein selecting the representative sub-block of the candidate block includes executing a deterministic function on multiple sub-blocks of the candidate block, and providing the representative sub-block as a sub-block of the multiple sub-blocks for which the deterministic function generates an extremum result.

2. The method of claim 1, wherein the deterministic function is an entropy function, and wherein the representative sub-block is a highest-entropy sub-block of the multiple sub-blocks.

3. The method of claim 1, wherein the digest database associates the matching entry with a list of full blocks that contain the representative sub-block.

4. The method of claim 3, wherein the list of full blocks includes descriptive data about the full blocks, and wherein the method further comprises selecting one of the full blocks based at least in part on the descriptive data for that full block.

5. The method of claim 4, wherein the descriptive data for one of the full blocks indicates a storage tier on which that full block is placed, and wherein selecting one of the full blocks is based at least in part on the storage tier indicated for that full block.

6. The method of claim 4, wherein the descriptive data for one of the full blocks includes a reference count that indicates a number of times that the full block has been a target of deduplication, and wherein selecting one of the full blocks is based at least in part on the reference count indicated for that full block.

7. The method of claim 4, wherein the descriptive data for one of the multiple full blocks includes a sequential-block indicator that indicates whether the full block is part of a sequence of blocks, and wherein selecting one of the full blocks is based at least in part on the sequential block indicator for that full block.

8. The method of claim 1, wherein matching the representative sub-block to the entry in the digest database includes generating a sub-block hash of the representative sub-block and matching the sub-block hash to a digest in the digest database associated with the matching entry.

9. The method of claim 3, wherein generating the sub-block hash includes performing at least one of (i) a cryptographic hash, (ii) a semi-cryptographic hash, and (iii) a similarity hash on the representative sub-block.

10. The method of claim 3, further comprising:
comparing the first position to the second position to determine whether the adjacent block is a preceding block or a following block; and
accessing, based on the comparing, the adjacent block as one of the preceding block and the following block.

11. The method of claim 3, further comprising:
comparing data of a set of sub-blocks of the adjacent block to a corresponding set of sub-blocks of the candidate block; and
in response to the set of sub-blocks of the adjacent block matching the corresponding set of sub-blocks of the candidate block, (i) comparing a set of additional sub-blocks of the adjacent block to a set of sub-blocks of an adjacent candidate block adjacent to the candidate block and (ii) in response to one or more of the set of additional sub-blocks of the adjacent block matching one or more of the set of sub-blocks of the adjacent candidate block, performing a deduplication operation on the adjacent candidate block.

12. A computerized apparatus, comprising control circuitry that includes a set of processing units coupled to memory, the control circuitry constructed and arranged to:
select a representative sub-block of a candidate block, the representative sub-block occupying a first position within the candidate block;
match the representative sub-block to an entry in a digest database, the matching entry identifying a target block that contains the representative sub-block in a second position; and
effectuate storage of the candidate block by referencing the target block and an adjacent block adjacent to the target block,
wherein the control circuitry constructed and arranged to select the representative sub-block of the candidate block is further constructed and arranged to execute a deterministic function on multiple sub-blocks of the candidate block and to provide the representative sub-block as a sub-block of the multiple sub-blocks for which the deterministic function generates an extremum result.

13. A computer program product including a set of non-transitory, computer-readable media having instructions which, when executed by control circuitry of a computerized apparatus, cause the computerized apparatus to perform a method of performing data deduplication, the method comprising:
selecting a representative sub-block of a candidate block, the representative sub-block occupying a first position within the candidate block;
matching the representative sub-block to an entry in a digest database, the matching entry identifying a target block that contains the representative sub-block in a second position; and
effectuating storage of the candidate block by referencing the target block and an adjacent block adjacent to the target block,
wherein selecting the representative sub-block of the candidate block includes executing a deterministic function on multiple sub-blocks of the candidate block, and providing the representative sub-block as a sub-block of the multiple sub-blocks for which the deterministic function generates an extremum result.

14. The computer program product of claim 13, wherein the digest database associates the matching entry with a list of full blocks that contain the representative sub-block,
wherein the list of full blocks includes descriptive data about the full blocks, and
wherein the method further comprises selecting one of the full blocks based at least in part on the descriptive data for that full block.

15. The computer program product of claim 14, wherein the descriptive data for one of the full blocks indicates a storage tier on which that full block is placed, and wherein selecting one of the full blocks is based at least in part on the storage tier indicated for that full block.

16. The computer program product of claim 14, wherein the descriptive data for one of the full blocks includes a reference count that indicates a number of times that the full block has been a target of deduplication, and wherein selecting one of the full blocks is based at least in part on the reference count indicated for that full block.

17. The computer program product of claim 14, wherein the descriptive data for one of the multiple full blocks includes a sequential-block indicator that indicates whether the full block is part of a sequence of blocks, and wherein selecting one of the full blocks is based at least in part on the sequential block indicator for that full block.

18. The computer program product of claim 13, wherein matching the representative sub-block to the entry in the digest database includes generating a sub-block hash of the representative sub-block and matching the sub-block hash to a digest in the digest database associated with the matching entry.

* * * * *